(12) United States Patent
Damzen

(10) Patent No.: US 7,256,931 B2
(45) Date of Patent: Aug. 14, 2007

(54) OPTICAL AMPLIFYING DEVICE

(75) Inventor: Michael John Damzen, London (GB)

(73) Assignee: Imperial College Innovations Limited, London (GB)

( * ) Notice: Subject to any disclaimer, the term of this patent is extended or adjusted under 35 U.S.C. 154(b) by 0 days.

(21) Appl. No.: 10/519,429

(22) PCT Filed: Jul. 9, 2003

(86) PCT No.: PCT/GB03/02956

§ 371 (c)(1),
(2), (4) Date: Oct. 14, 2005

(87) PCT Pub. No.: WO2004/006395

PCT Pub. Date: Jan. 15, 2005

(65) Prior Publication Data

US 2006/0103918 A1    May 18, 2006

(30) Foreign Application Priority Data

Jul. 9, 2002 (GB) .................................. 0215847.5

(51) Int. Cl.
H01S 3/00 (2006.01)
(52) U.S. Cl. ................................. 359/341.42
(58) Field of Classification Search ............ 359/341.32
See application file for complete search history.

(56) References Cited

U.S. PATENT DOCUMENTS 4,785,459 A    11/1988  Baer
4,839,902 A *   6/1989  Guch, Jr. ................... 372/70
5,315,612 A *   5/1994  Alcock et al. .............. 372/69
5,485,482 A     1/1996  Selker et al.
5,521,932 A *   5/1996  Marshall .................... 372/36
5,546,222 A *   8/1996  Plaessmann et al. ........ 359/346
5,619,522 A *   4/1997  Dube ........................ 372/72
5,774,489 A     6/1998  Moulton et al.
6,002,695 A    12/1999  Alfrey et al.
6,014,391 A *   1/2000  Byren ....................... 372/34
6,081,542 A *   6/2000  Scaggs ...................... 372/70
6,167,069 A *  12/2000  Page et al. ................. 372/34
6,658,036 B1* 12/2003  Carrig et al. ............... 372/66
6,671,305 B2* 12/2003  Knights et al. ............. 372/92
6,763,050 B2*  7/2004  Zapata et al. .............. 372/70
7,068,700 B2*  6/2006  Rapoport et al. ........... 372/94
2002/0097769 A1*  7/2002  Vetrovec ................... 372/75
2002/0105997 A1*  8/2002  Zhang ....................... 372/70
2002/0118718 A1*  8/2002  Honea et al. ............... 372/71
2003/0198265 A1* 10/2003  Vetrovec ................... 372/35
2005/0111510 A1*  5/2005  Gong et al. ................ 372/70
2005/0195880 A1*  9/2005  Kiriyama et al. ........... 372/70
2006/0078030 A1*  4/2006  Altmann .................... 372/69
2006/0109878 A1*  5/2006  Rothenberg ................ 372/35

\* cited by examiner

*Primary Examiner*—Deandra M. Hughes
(74) *Attorney, Agent, or Firm*—Morgan & Finnegan, LLP

(57) ABSTRACT

In an optical amplifying device, an optical beam passes multiple times through a grazing-incidence bounce amplifier, accessing different parts (G1,G2) of the gain region on each transit. This provides improved characteristics in beam quality, with higher power scalability. The multipass configuration can operate as a high gain amplifier device and, with the addition of suitable feedback such as reflectors (M1-M4), as a laser oscillator to provide an optical source.

13 Claims, 5 Drawing Sheets

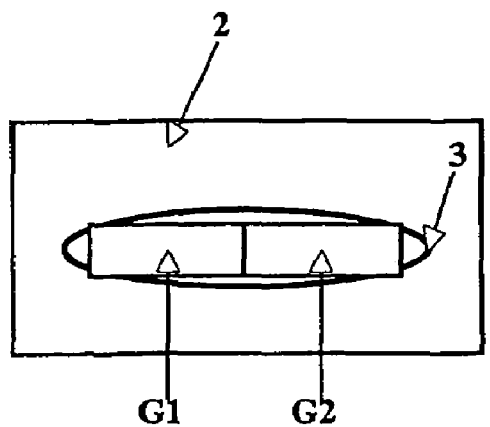
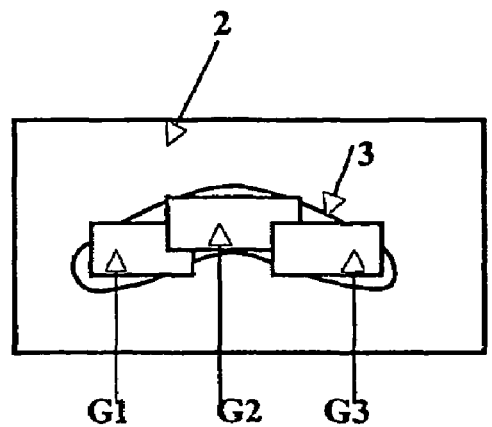
FIGURE 3A · FIGURE 3B
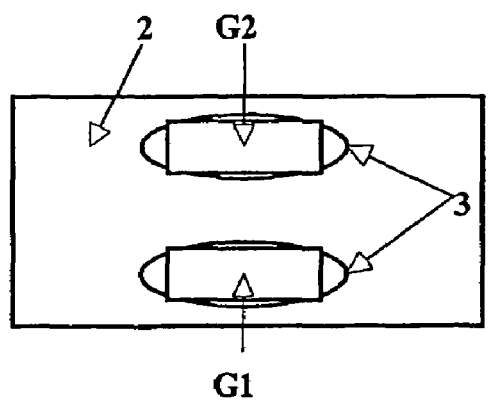
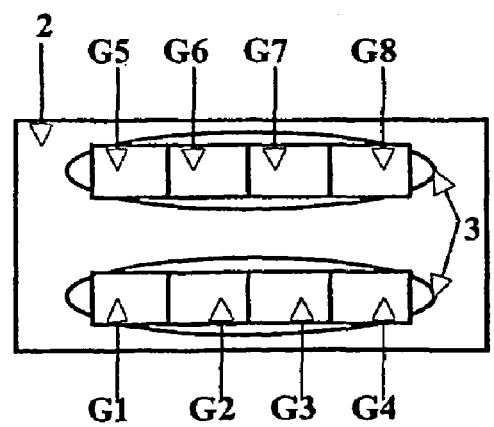
FIGURE 3C · FIGURE 3D

OPTICAL AMPLIFYING DEVICE

The present invention relates to an optical amplifying device and/or an optical source.

Diode-pumped solid-state slab amplifier configurations are known in which a source of optical radiation is directed into a block of laser material to produce gain in the laser material. Such a configuration can be used for amplification or, with the addition of resonant feedback to the laser material to produce lasing, as an optical source.

Many applications of lasers require, or would benefit from, increased optical power output, but this power scaling is usually preferably accompanied by maintenance of high spatial quality of the radiation and operation at high efficiency. A known problem which arises in diode-pumped solid-state lasers; is the presence of thermally-induced distortions due to the pumping mechanism that lead to degradation in beam quality.

A number of geometries have been developed for diode-pumping, mainly based on end-pumping and side-pumping configurations. End-pumping tends to be limited in power scalability by thermal lensing and difficulty of diode reshaping and delivery when using multiple diode bars. Meanwhile side-pumping shows non-uniformity of pumping distribution and inefficient overlap with a high quality laser mode.

U.S. Pat. No. 5,315,612 (National Research Council of Canada) shows a grazing incidence slab laser with total internal reflection from the pump face of a side-pumped laser slab with high absorption for the pump radiation. This provides high gain with a shallow angle of incidence and considerable averaging of thermally-induced refractive index and gain non-uniformity. Demonstration of this arrangement has shown operation at over 20 W of average power with optical efficiency over 60%. The spatial beam quality in the plane of the bounce, however, is in general degraded at the higher powers.

According to a first aspect of the present invention, there is provided an optical amplifying device which is side-pumped in use to provide a gain region, the device comprising path definition means for defining a path through the gain region for optical radiation to be amplified, wherein the path definition means is arranged such that said path comprises at least two, spatially separated, grazing incidence reflections in the gain region.

Such a path can be described as a multipass path through the gain region since the optical radiation to be amplified passes more than once through the gain region.

"Grazing incidence" in this context may generally be taken to mean up to about 10 degrees, although benefit might still be gained in using a grazing incidence of up to 11, 12, 13, 14, 15, 16, 17, 18, 19 or 20 degrees.

Preferably the gain region has more than one gain area, and the reflections occur in different respective gain areas. For instance, each gain area of the gain region might simply be a different spatial area of a common gain region or gain areas might be provided by different respective pump sources.

Embodiments of the invention can thus provide multipass passage of an optical beam through a grazing-incidence bounce amplifier, accessing different parts of the gain region on each transit, which has been found can lead to improved characteristics in beam quality, particularly with higher power scalability. The multipass configuration can operate as a high gain amplifier device and, with the addition of suitable feedback such as cavity reflectors, as a laser oscillator to provide an optical source.

A slab amplifier that might typically be used in an embodiment of the invention might comprise a crystal that is side pumped on one of its faces by a radiation source that is strongly absorbed by the crystal thereby producing population inversion (to support amplification in the known manner of a laser) in a shallow region inside the pump face. On each pass through the amplifier crystal a laser beam undergoes total internal reflection at the pump face at a grazing angle of incidence. On each pass the beam is directed to reflect from different regions of the pumped face. The multipass technique provides the opportunity for a greater degree of averaging of thermally-induced distortions and gain non-uniformity leading to higher spatial beam quality for amplified radiation. For specific pumping distributions, the multipass amplifier can lead to improvement in the efficiency and gain of the amplifier. Overall, embodiments of the invention can provide improved operation in maintaining near diffraction-limited beam quality Preferably, the gain extraction associated with each grazing incidence reflection in the gain region is of a comparable magnitude. This supports more uniform amplification properties in the device.

Where feedback has been provided to configure the multipass amplifier to operate as a multipass laser oscillator, the laser oscillator operates with similar improvements in beam quality and efficiency as does the amplifier.

According to a second aspect of the present invention, there is provided a method of amplifying optical radiation which method comprises passing the radiation through a side-pumped bounce amplifier along a path providing total internal reflection at grazing incidence at at least two spatially different locations on a side-pumped face of the amplifier.

A multipass bounce amplifier will now be described as an embodiment of the present invention, by way of example only, with reference to the accompanying figures in which:

FIG. 3 shows a schematic diagram of a pump face of the bounce amplifier showing examples of different arrangements of pump regions that can be accessed by multipassing of the amplifier;

Figure 1:
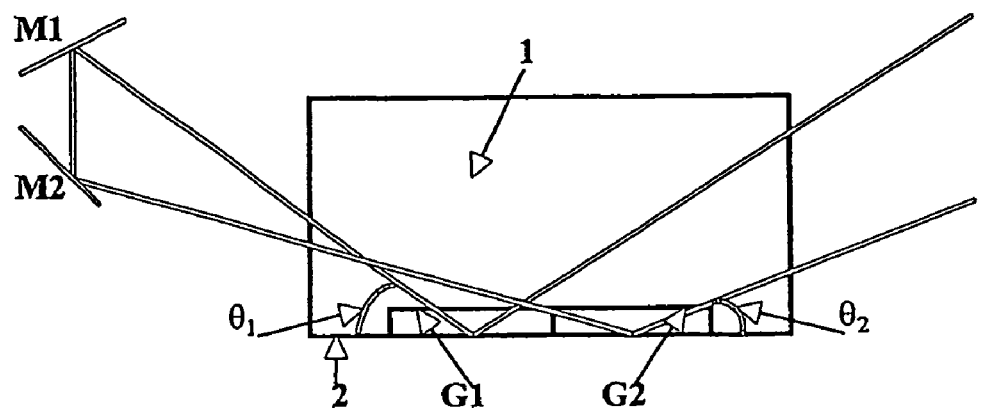
FIG. 1 shows a schematic diagram of the bounce amplifier illustrating the case of two passes with external feedback of a beam for the second pass.

Referring to FIG. 1, a two-pass embodiment of the invention is shown to illustrate the principle of operation.

The bounce amplifier comprises a laser medium 1 grown as a single crystal of a solid-state laser material such as Nd:YVO$_4$. The amplifier is diode-pumped in known manner by a radiation source (not shown) directed at a flat face of the crystal, referred to as the pump face 2. The laser medium 1 is pumped by use of a known optical population inversion mechanism in a source, particularly a laser diode. The laser medium material should have high absorption for the optical population inversion source. This provides high inversion density inside the crystal, within a shallow region adjacent the pump face 2.

For the purposes of illustration, this inversion or gain region can be considered to be divided into two gain regions G1 and G2. On one pass through the laser material, a laser beam is incident at a shallow angle of incidence, $\square_1$, with respect to the pump face 2, and centred within the gain region G1, where it experiences total internal reflection from the pump face and gain from the region G1. External feedback is provided for example by a pair of mirrors M1 and M2 which redirect the beam towards gain region G2 for a second pass through the laser medium, experiencing reflection at angle $\square_2$ with respect to the pump face, and gain from region G2.

The gain regions G1 and G2 of FIG. 1 are presented as rectangular and equally sized for illustrative purposes. The real gain distribution will have shape determined by the pump distribution. Different regions may have different sizes determined by the size of the pumping beam at the pump face 2.

The beam being amplified on a pass through a gain region may also partially overlap the beam being amplified on a pass through an adjacent gain region. However, a preferred implementation is that the beams should be substantially separated, although partial overlap at adjacent wings of the beams may be necessary for the beams to extract a significant fraction of the total gain distribution.

The size of the beam passing through each gain region will depend on several factors including the input beam parameters, diffraction, and thermally-induced lensing and aberrations within the pumped laser medium. Some control of the sizes is given by suitable selection of the input beam and external feedback reflectors M1 and M2.

Although the gain regions need not be equal, it is preferable that the gain extraction occurring on each pass is of a comparable magnitude and that the total extracted regions of G1 and G2 should encompass a considerable fraction of the actual pump distribution for efficient operation.

Figure 2:
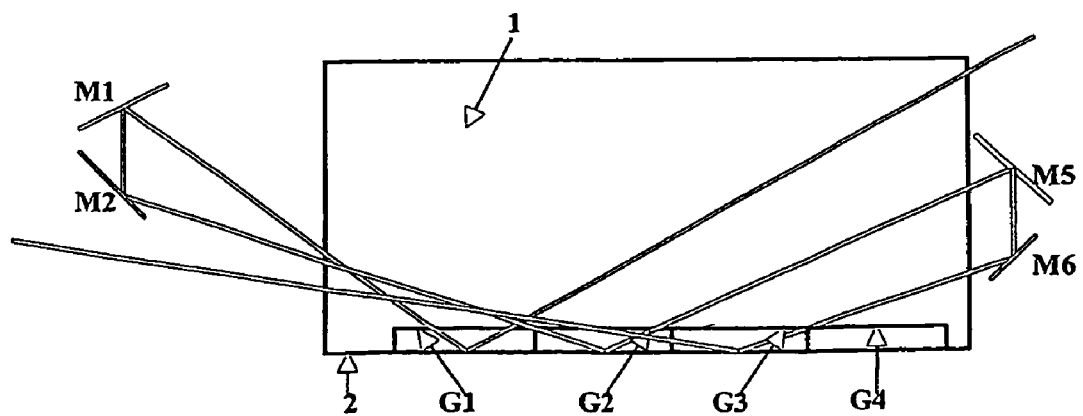
FIG. 2 shows a schematic diagram of the bounce amplifier showing extension to three and higher numbers of passes.

Referring to FIG. 2, the operative principles of FIG. 1 can be extended to a third pass using additional feedback, which by way of example can be achieved by a further pair of mirrors M5 and M6. In the third pass the beam is directed to a third gain region G3. The three pass implementation can of course in principle be cascaded to access a fourth region G4 and in general an integer number of passes accessing a larger number of gain sub-regions. The gain regions accessed in a multipass amplification do not need to be sequential (G1, G2, G3 . . . ) but can be accessed in any convenient or beneficial order (e.g. G1, G3, G2 . . . ).

Referring to FIG. 3, the multipass technique can be extended to access the gain from a more complex array of gain regions that might be created by a more complex pumping distribution. FIG. 3 illustrates examples of distributions as seen on the pump face 2 of the laser medium. FIG. 3A shows a two-pass amplifier configuration with two gain regions G1 and G2, encompassing a simple pump distribution 3. FIG. 3B shows a more complex (curved) pump distribution 3 that might be produced by imperfections in the quality of a diode laser bar. In this example three gain regions G1, G2 and G3 are selected to provide effective overlap by a high spatial quality laser beam.

The example shown in FIG. 3B provides insight into the improvement in the multipass amplifier over a single pass implementation. Attempting to amplify, in a single bounce, a large size beam covering the whole gain region, leads to degradation in beam quality of the amplified beam due to the poor spatial overlap of a high quality Gaussian laser mode with the gain distribution and non-uniformity due to thermally-induced refractive index changes leading to phase aberrations. In the multipass amplifier of embodiments of the present invention, a high quality beam can be anmplified in smaller regions with more uniformity of gain and smaller phase variation. Furthermore, by suitable adjustment of feedback the regions can be optimised to allow some degree of averaging of the gain and phase variations between each region. The higher quality of overlap with the multipass beam can also result in increased efficiency of the amplifier.

FIG. 3C shows a further example where the gain distribution is in two discrete regions 3, as might be provided by pumping with two diode laser bars, and accessed by two bounces in regions G1 and G2.

FIG. 3D shows the two discrete regions of FIG. 3C, each separately accessed by multipass beam propagation in multiple gain sub-regions G1-G8.

Figure 4:
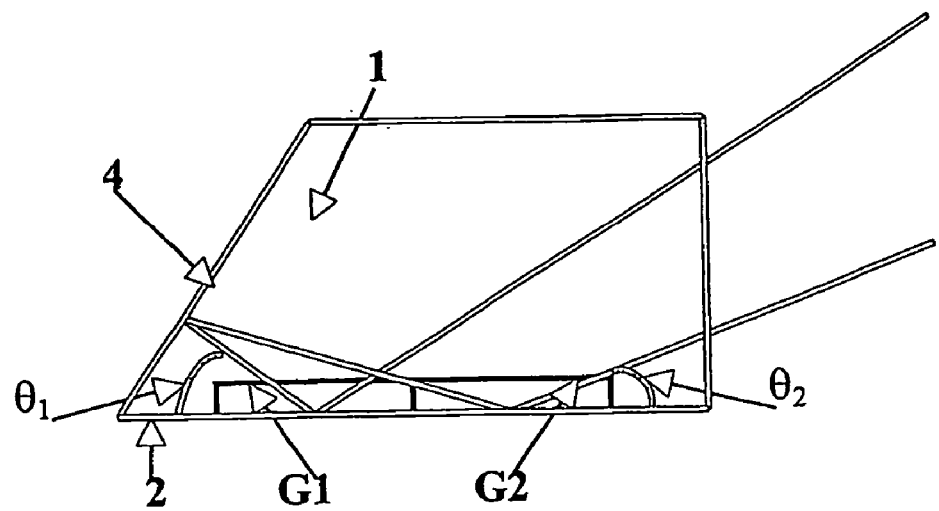
FIG. 4 shows a schematic diagram of the bounce amplifier illustrating the case of two passes with feedback for the second pass provided by reflection from a surface cut of the amplifier.

Referring to FIG. 4, in an alternative implementation of the two-pass amplifier, feedback for the second pass is provided by reflection from a reflecting surface 4 of the laser medium. This surface 4 can be specially coated for high reflectivity and cut at an appropriate angle together with selection of the angle of the incident beam to provide bounces to occur at the appropriate regions of the pump face 2.

Figure 5:
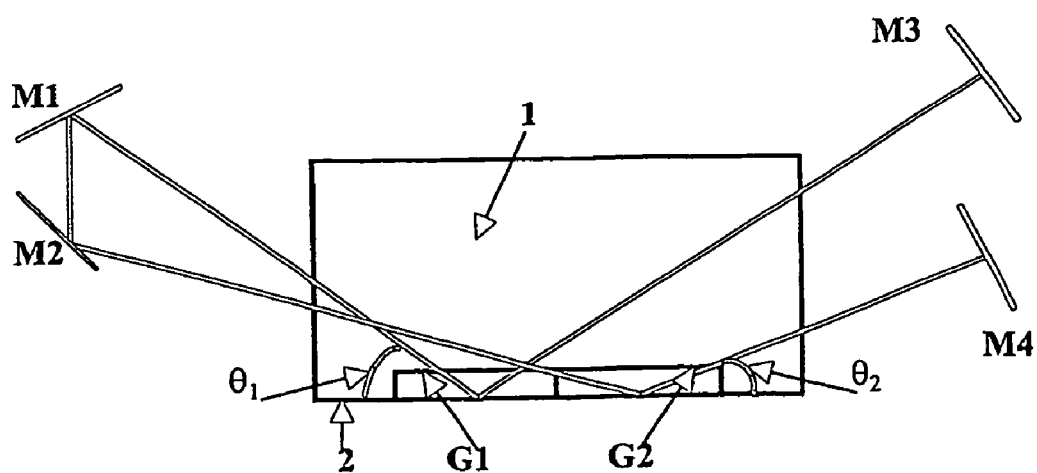
FIG. 5 shows a schematic diagram of the two-pass bounce amplifier of FIG. 1 with feedback mirrors forming a linear laser oscillator.
Figure 6:
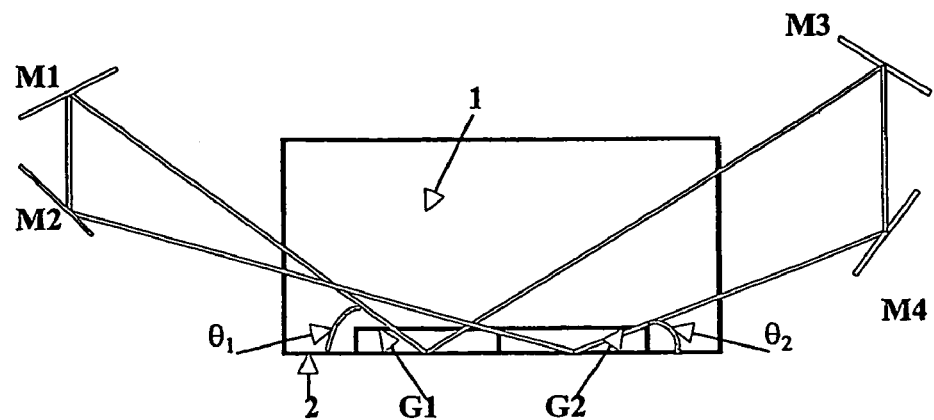
FIG. 6 shows a schematic diagram of the two-pass bounce amplifier of FIG. 1 with feedback mirrors forming a ring laser oscillator.
Figure 7:
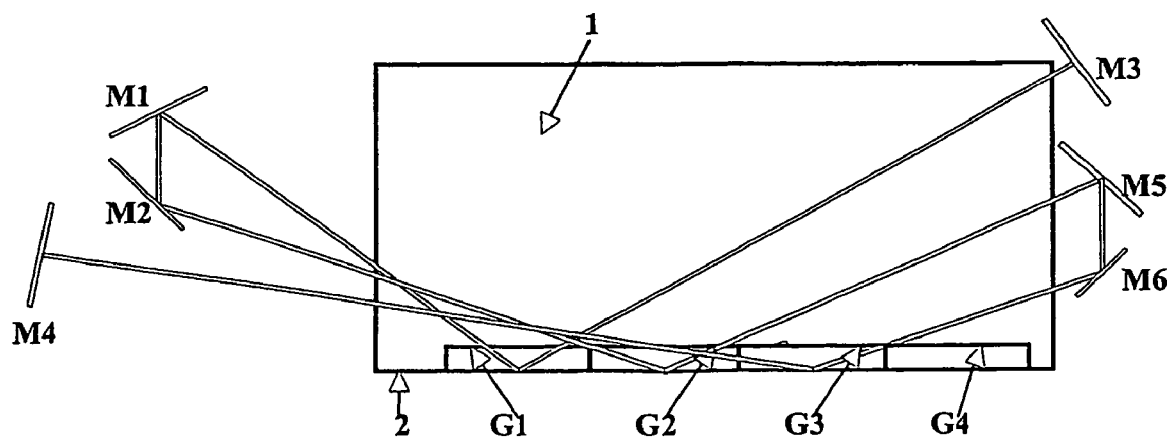
FIG. 7 shows a schematic diagram of the multipass bounce amplifier of FIG. 2 with feedback mirrors forming a linear laser oscillator.
Figure 8:
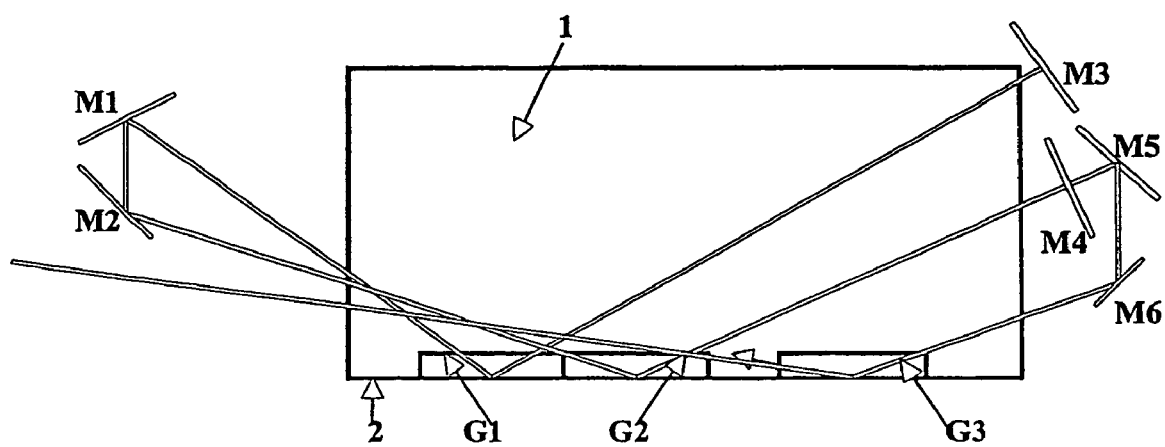
FIG. 8 shows yet a further alternative arrangement, again using feedback mirror to form a linear laser oscillator.

Referring to FIGS. 5, 6 and 7, it is possible to convert the multipass amplifier described above with reference to FIGS. 1 to 4 into a multipass laser oscillator, and thus an optical source.

FIG. 5 shows incorporation of two mirrors M3, M4 external to the laser medium 1 to form a linear laser cavity for the two-pass amplifier implementation of FIG. 1. A similar implementation (not shown) can be incorporated to convert the amplifier system of FIG. 4 into a laser oscillator. FIG. 6 shows incorporation of mirrors M3 and M4 to form a ring laser oscillator. Output from this laser could be from any of the mirrors M1 to M4 by making one of them partially transmitting. The laser can oscillate in both ring directions. Incorporation of a Faraday isolator into the ring can force unidirectional ring oscillation, in known manner. FIG. 7 shows incorporation of reflectors M3, M4 to form a laser oscillator from a three-pass amplifier system. The extension to higher-pass laser oscillator configurations is readily incorporated.

The laser mode in the multipass laser oscillator experiences the same advantages of the multipass amplifier, including improved mode overlap with the gain distribution and improvement in spatial quality of amplification due to increased averaging of gain and phase variations across the gain distribution. The multipass amplifier presents a smaller effective aperture for selection of the fundamental mode of the cavity.

A further implementation of the invention is to use one gain region to form a multipass laser oscillator and a separate region to act as an additional single or multipass amplification region.

In an example of an embodiment of the present invention described above with reference to FIG. 5, in a laser oscillator based on a double pass bounce amplifier, the laser medium 1 comprises a Nd:YVO4 slab pumped by a diode-bar emitting at wavelength 808 nm. The total length of the gain region G1, G2 at the pump face 2, in the plane of the bounce, is approximately 14 mm.

Bounce angles $\theta_1$, $\theta_2$ of approximately 7.5 degrees and 5 degrees are used for the two passes. The gain region was extracted in two approximately equal halves (G1 and G2) on each of the two bounces. A laser resonator was formed with output taken from a partially reflecting mirror M3. The laser oscillator had an output power of 26 Watts when pumped with 57 Watts of diode power. The output was spatially TEM00, with a beam quality parameter $M^2$ of 1.2 in the plane of the bounce and 1.05 in the perpendicular plane.

The invention claimed is:

1. An optical amplifying device comprising a slab of material which is pumped via a side face thereof with pump radiation of a frequency which is absorbed by the material to provide a gain region-adjacent said side face, the device defining a path through the gain region for optical radiation to be amplified, said path comprising at least two, spatially-different grazing-incidence reflections in said gain region.

2. A device according to claim 1 wherein the grazing incidence reflections include reflections of not more than 20 degrees.

3. A device according to claim 1 wherein the grazing incidence reflections include reflections of not more than 10 degrees.

4. A device according to claim 1 wherein the gain region has more than one gain area, and the reflections occur in different respective gain areas.

5. A device according to claim 4 wherein at least two gain areas of the gain region are different spatial areas of a common gain region.

6. A device according to claim 4 wherein at least two gain areas are each provided by different respective pump sources.

7. A device according to claim 1, provided with feedback to the gain region enabling the device to lase in use so as to provide an optical source.

8. A device according to claim 1 wherein the path comprises at least one mirror.

9. A device according to claim 1 wherein the path comprises at least one surface of the slab of material.

10. A device according to claim 1 wherein the gain extraction associated with each grazing incidence reflection in the gain region is of a comparable magnitude.

11. A method of amplifying optical radiation comprising side-pumping a slab of material via side face thereof with pump radiation of a frequency which is absorbed by the material to provide a gain region adjacent said side face, and guiding said optical radiation along a path comprising at least two spatially-different grazing-incidence reflections in said gain region.

12. A system comprising:

a first optical amplifying device comprising a slab of material which is pumped via a side face thereof with pump radiation of a frequency which is absorbed by the material to provide a gain region adjacent said side face, the device defining a path through the gain region for optical radiation to be amplified, said path comprising at least two, spatially-different grazing-incidence reflections in said gain region; and a second optical amplifying device for receiving and amplifying radiation output by the optical source comprising a slab of material which is pumped via a side face thereof with pump radiation of a frequency which is absorbed by the material to provide a gain region adjacent said side face, the device defining a path through the gain region for optical radiation to be amplified, said path comprising at least two, spatially-different grazing-incidence reflections in said gain region;

wherein said first and second optical amplifying devices share a common slab of material.

13. A device as claimed in claim 7, in which a common slab of material both amplifies said optical radiation and receives and amplifies radiation output by said optical source.

* * * * *